Patented July 3, 1945

2,379,557

UNITED STATES PATENT OFFICE 2,379,557

MANUFACTURE OF POLYAMIDE STRUCTURES

William Way Watkins, Buffalo, N. Y., assignor to E. I. du Pont de Nemours & Company, Wilmington, Del., a corporation of Delaware No Drawing. Application April 23, 1942, Serial No. 440,211

11 Claims. (Cl. 18—48)

This invention relates to an improved process for transparentizing structures composed of synthetic linear polyamides. For convenience, the invention will be discussed with particular reference to the transparentizing of synthetic linear polyamide sheets and films. It is to be understood, however, that the invention is not so limited.

The production of transparent synthetic linear polyamide sheets and films has been known prior to the present invention; however, such previously known processes have certain disadvantages. For example, the production of transparent synthetic linear polyamide films by a process of melt casting is disclosed in Foster U. S. Patent No. 2,212,770. The melt casting of films of any substantial width, however, presents innumerable problems. Difficulties have consequently been encountered in the commercial exploitation of such a process.

The copending application of Orion E. Schupp, Jr., Serial No. 362,660, filed October 24, 1940, discloses a method of dissolving synthetic linear polyamides in solutions of metal salts in alcohols. Such solutions can be readily used for the extrusion and casting of films and sheets. However, by the casting of films and sheets in accordance with the above-identified Schupp process, extruded or cast sheets and films will be opaque in nature. The opaqueness is due to the presence of voids within the sheet or film structure. Sheets and films produced from other solutions of synthetic linear polyamides will also often be opaque due to the presence of voids therein. For certain purposes, it is highly desirable that sheets and films composed of synthetic linear polyamides be clear and transparent.

It is an object of this invention to provide a new and improved process for the transparentizing of synthetic linear polyamide structures which are opaque by reason of the presence of voids.

Other objects of the invention will appear hereinafter.

By the term, "synthetic linear polyamides," as used throughout the specification and claims, is meant synthetic linear polyamides of the types described in U. S. Patents Nos. 2,071,250, 2,071,253 and 2,130,948. These polyamides contain amide groups

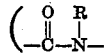

where R is hydrogen or a monovalent hydrocarbon radical) as an integral part of the main chain of atoms in the polymer. Further, the average number of carbon atoms in the segments of the chain separating the amide groups in these polyamides is at least two.

In accordance with the present invention, synthetic linear polyamide structures having a quench index above 125 mils and which are opaque by reason of the presence of voids can be transparentized by subjecting said structures, in their water-wet state (i. e. containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said liquid will completely dissolve or melt said polyamide; that is, substantially destroy the said polyamide structure. By the term "completely dissolve or melt" or by the term "substantially destroy" the polyamide, as used in the present specification and claims, is meant the dissolving, melting or destruction of a self-supporting film of the polyamide, under the conditions of treatment, to the point where it is no longer self-supporting.

The following specific examples illustrate certain preferred methods for carrying out the present invention, it being understood that the invention is not to be limited to the details set forth in these examples:

Example I

Five hundred parts of an interpolymer prepared from hexamethylene diammonium adipate and hexamethylene diammonium sebacate in the proportion of 30% of the former and 70% of the latter are dissolved in a solution comprising 500 parts of calcium chloride and 1500 parts of methanol. A glass plate is coated with a quantity of the solution and excess solution is removed by means of a doctor knife. The methanol is removed completely by evaporation and the plate containing the film is washed in tap water to remove the calcium chloride therefrom. The resulting film is opaque by reason of the presence of voids therein, and of little interest where it is desired to have a transparent film. The film, while still wet, is dipped in a bath of glycerol, maintained at a temperature of 140° to 145° C. The film remains immersed in the glycerol for only a period of about three seconds. After removal from the bath, the film is washed to remove the glycerol and it is then dried under sufficient tension to prevent the formation of wrinkles in the film. The resulting film will be characterized by glass-clear transparency and very satisfactory physical properties.

Example II

A film produced in accordance with the procedure of Example I which has been washed free of calcium chloride and which has not yet been dried is dipped into a bath of white oil maintained at a temperature of 140° to 145° C. for a few seconds. After removal from the bath, the film is washed with suitable solvents to remove the white oil, and it is then dried in the customary manner. The film has good transparency and satisfactory physical characteristics.

Example III

A film produced in accordance with the method of Example I and which has not yet been dried is dipped for a period of a few seconds into a bath of aniline having a temperature of between 90° and 100° C. After removal from the bath, the film is washed in methanol and dried while maintained under sufficient tension to prevent the formation of wrinkles in the film. The resulting film will have glass-clear transparency, but will be slightly brittle in nature.

For the production of transparent synthetic linear polyamide articles in accordance with the present invention, it is preferred to use an interpolyamide prepared from hexamethylene diammonium adipate and hexamethylene diammonium sebacate, preferably in the proportion of 30% of the former and 70% of the latter. It is nevertheless possible to use interpolymers containing the above two ingredients in a range between 15% of the former and 85% of the latter to 45% of the former and 55% of the latter. The above range represents the most readily meltable interpolymers which can be prepared from the above two compounds.

Although the above-named interpolymers are particularly useful for the purpose of the present invention, it is within the scope of the invention to use any synthetic linear polyamide, including synthetic linear interpolyamides, provided that the polyamide has a quench index above 125 mils, and provided that it is film-forming or fiber-forming in character. Whether a synthetic linear polyamide has a quench index of above 125 mils can be determined in the following manner:

Sheet aluminum of 0.008 inch thickness is wrapped around a steel wedge having a width of approximately 1⅛ inches, a length of approximately 8 inches and an included angle of 2.5°. The seams of the aluminum sheet are locked and hammered so that a water-tight mold is constructed. This mold is filled with flakes of the synthetic linear polyamide to be tested, and the mold is placed in a test tube which is evacuated and heated by positioning the same within a bath of diphenylene oxide vapor for 60 minutes to melt the polyamide. The vacuum line to the test tube is then closed and carbon dioxide is slowly admitted to the tube. Twenty seconds after shutting off the vacuum, the wedge is quenched by dropping it into a mass of water having a temperature of 0° C. The aluminum is then dissolved from the polyamide, for example, by means of sodium hydroxide solution. It is found that the polyamide at the tip of the mold and for some distance upward is transparent because of rapid quenching. The quenching properties of the polyamide determine how much of the wedge will be clear and how much will be cloudy or opaque because of crystallization. The line of demarcation between clear and cloudy polyamide can be easily seen and marked with ink. The thickness of the wedge at various points along this line is measured with a micrometer. An average of four such measurements is usually sufficient and is taken as the quench index of the polyamide. The quench index of a given polyamide can be reproduced within about ±5% of a given value.

In the above examples specific reference was made to the use of synthetic linear polyamides dissolved in calcium chloride-methanol solvents. Numerous other metal salt-alcohol solvents may be used in the same manner. The above-identified Schupp application discloses other metal salts which may be used as equivalents for calcium chloride. For example, zinc, magnesium, lithium, strontium, aluminum, titanium, bismuth, cobalt and iron, bromides, iodides, nitrates and thiocyanates may be used. The concentration of polymer in the solvent may vary between wide limits. It is only necessary that the solution may be coated to produce a film or may be spun to form a thread, or formed in the shape of other articles. It is preferred, however, to use solutions comprising substantially saturated solutions of the polyamide, and it is also preferred that the metal salt concentration used be that which will give substantially the highest concentration of polymer in the solution. Synthetic linear polyamide structures which are opaque by reason of the presence of voids will also be produced by numerous other known methods for the production of synthetic linear polyamide structures; for example, the production of such structures from alcohol solutions of these polyamides or solutions of these polyamides in other solvents. The present invention is applicable to the transparentizing of structures of any of the above-mentioned synthetic linear polyamides which are opaque due to the presence of voids however produced.

The treatment of synthetic linear polyamide structures in accordance with the present invention may be carried out with any non-aqueous liquid which is non-reactive with and incapable of completely dissolving the polyamide at the temperature of treatment, the treatment temperature being at least 75° C. Besides the glycerol, white oil and aniline described in the examples, one might mention such diverse materials as higher alcohols, for example, normal hexyl alcohol, Dowtherm heating fluid (a mixture of diphenyl and diphenyl oxide), and Wood's metal.

Although not a part of the present invention, it is believed that polyamide films and the like can be similarly transparentized by the use of certain highly concentrated salt solutions, such as may be heated to temperature of the order of 140° C. Such a salt solution may consist of an aqueous zinc chloride solution of sufficient concentration to have a boiling point of at least 140° C.

The treatment is carried out at a temperature of at least 75° C. but below, but not exceeding 10° below, the temperature at which said liquid will completely dissolve or melt said polyamide. In other words, if the liquid used has no dissolving action on the polyamide even at elevated temperatures, it should be used at a temperature within 10° of the melting point of the polyamide. If, on the other hand the liquid will completely dissolve the polyamide at an elevated temperature above 75° C., it should be used at a temperature below, but not exceeding 10° below, that temperature at which it will completely dissolve the polyamide. Under no circumstances, however, should the treating liquid have a temperature of less than 75° C.

With regard to the tension used during the drying of the film, or similar articles, there is no objection to applying considerable tension to the film. It is desirable, however, that the film be held sufficiently taut to prevent the formation of wrinkles therein which would normally be caused by drying the film in a relaxed condition.

For convenience, this invention has been discussed with particular reference to the production of sheets or films. It is to be clearly understood, however, that the invention is not limited to the production of sheets or films, and that equally desirable results may be produced if articles of other forms are produced in accordance with the present invention. For example, the invention is applicable to the production of yarns, fibers, films, or even structures having considerable mass such as rods, tubes, plates, and the like. Care must be taken, however, with more massive objects because by the time desirable results are accomplished with the interior portion of the objects, an undesirable change may be effected on the exterior portion.

The present invention provides for a simple, unique and practical process for transparentizing synthetic linear polyamide structures. Films having a glass-clear transparency can be produced in accordance with the present invention, and such films can be produced without seriously affecting the physical characteristics of the films.

Since it is obvious that many changes and modifications can be made in the above-described details without departing from the nature and spirit of the invention, it is to be understood that the invention is not to be limited except as set forth in the appended claims.

I claim:

1. The process of transparentizing a structure composed of a synthetic linear polyamide having a quench index above 125 mils and which is opaque by reason of the presence of voids which comprises subjecting said structure, in its water-wet state (i. e., containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

2. The process of transparentizing a structure composed of a synthetic linear polyamide having a quench index above 125 mils and which is opaque by reason of the presence of voids which comprises subjecting a structure composed of a synthetic linear interpolyamide, in its water-wet state (i. e., containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

3. The process of transparentizing a structure composed of a synthetic linear polyamide having a quench index above 125 mils and which is opaque by reason of the presence of voids which comprises subjecting a structure composed of an interpolymer prepared from hexamethylene diammonium adipate and hexamethylene diammonium sebacate, in its water-wet state (i. e., containing the amount of water which the structure will absorb when in equilibrium with water in the liquid phase) to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

4. The process of transparentizing a structure composed of a synthetic linear polyamide having a quench index above 125 mils and which is opaque by reason of the presence of voids which comprises subjecting a structure composed of an interpolymer prepared from hexamethylene diammonium adipate and hexamethylene diammonium sebacate in the proportion of 30% of the former to 70% of the latter, in its water-wet state (i. e., containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

5. The process of transparentizing a film composed of a synthetic linear polyamide having a quench index above 125 mils and which is opaque by reason of the presence of voids which comprises subjecting said film, in its water-wet state (i. e., containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

6. The process of transparentizing a film composed of a synthetic linear polyamide having a quench index above 125 mils and which is opaque by reason of the presence of voids which comprises subjecting a film composed of a synthetic linear interpolyamide, in its water-wet state (i. e., containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

7. The process of transparentizing a film composed of a synthetic linear polyamide having a quench index above 125 mils and which is opaque by reason of the presence of voids which comprises subjecting a film composed of an interpolymer prepared from hexamethylene diammonium adipate and hexamethylene diammonium sebacate, in its water-wet state (i. e., containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

8. The process of transparentizing a film composed of a synthetic linear polyamide having a quench index above 125 mils and which is opaque by reason of the presence of voids which comprises subjecting a film composed of an interpolymer prepared from hexamethylene diammonium adipate and hexamethylene diammonium sebacate in the proportion of 30% of the former to 70% of the latter, in its water-wet state (i. e., containing the amount of water which the structure will absorb when in equilibrium with water in the liquid phase), to treatment with a non-aqueous liquid which is non-reactive with and incapable of completely dissolving said polyamide at the temperature of treatment, said treating liquid having a temperature of at least 75° C. but below, but not exceeding 10° below, the temperature at which said structure is completely destroyed.

9. The process of transparentizing a structure composed of a synthetic linear polyamide having a quench index above 125 mils and which is opaque by reason of the presence of voids which comprises subjecting said structure, in its water-wet state (i. e., containing the amount of water which the structure will absorb when in equilibrium with water in the liquid phase), to treatment with glycerol having a temperature between 140° and 145° C.

10. The process of transparentizing a structure composed of a synthetic linear polyamide having a quench index above 125 mils and which is opaque by reason of the presence of voids which comprises subjecting said structure, in its water-wet state (i. e., containing the amount of water which the structure will absorb when in equilibrium with water in the liquid phase), to treatment with white oil having a temperature between 140° and 145° C.

11. The process of transparentizing a structure composed of a synthetic linear polyamide having a quench index above 125 mils and which is opaque by reason of the presence of voids which comprises subjecting said structure, in its water-wet state (i. e., containing the amount of water which the structure will absorb when in equilibrium with water in the liquid phase), to treatment with aniline having a temperature of 90° to 100° C.

WILLIAM W. WATKINS.